United States Patent
Hiratsuka et al.

(10) Patent No.: US 7,405,649 B2
(45) Date of Patent: Jul. 29, 2008

(54) COMMUNICATION CONTROL APPARATUS

(75) Inventors: Kazuhiko Hiratsuka, Miyagi-ken (JP); Masaaki Tanaka, Miyagi-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 511 days.

(21) Appl. No.: 11/247,095

(22) Filed: Oct. 6, 2005

(65) Prior Publication Data
US 2006/0082450 A1    Apr. 20, 2006

(30) Foreign Application Priority Data
Oct. 14, 2004    (JP)    ............................ 2004-300416

(51) Int. Cl.
H04B 1/08    (2006.01)
H04B 7/00    (2006.01)

(52) U.S. Cl. ...................... 340/425.5; 455/68; 455/345; 455/420; 340/438; 701/29; 701/36

(58) Field of Classification Search .................... 455/68, 455/344–345, 67.11, 67.13, 418–420, 423–425; 701/29–49; 340/438–462
See application file for complete search history.

(56) References Cited
U.S. PATENT DOCUMENTS

| | | | | |
|---|---|---|---|---|
| 4,255,789 A | * | 3/1981 | Hartford et al. | ............. 701/108 |
| 5,438,506 A | * | 8/1995 | Oho et al. | ....................... 700/9 |
| 6,012,005 A | * | 1/2000 | Gscheidle et al. | ............. 701/34 |
| 2003/0039050 A1 | * | 2/2003 | Chiba | .......................... 360/69 |
| 2005/0057259 A1 | * | 3/2005 | Hornsby et al. | ............. 324/512 |

FOREIGN PATENT DOCUMENTS
JP    7-240969    9/1995

* cited by examiner

*Primary Examiner*—Simon D Nguyen
(74) *Attorney, Agent, or Firm*—Brinks Hofer Gilson & Lione

(57)    ABSTRACT

A communication control apparatus of the present invention controls communication among a plurality of electronic devices mounted on a vehicle and mainly includes a control unit that is configured of a micro computer or the like and that periodically outputs clock pulses, a trouble detecting unit to detect a trouble in the control unit, and a communication control unit to interrupt communication upon detection of a trouble, that is, to control communication by disconnecting an electronic device. The trouble detecting unit includes an analog amount converting unit to convert clock pulses from the control unit to an analog amount and an analog amount comparing unit to compare the analog amount generated in the analog amount converting unit with a predetermined threshold.

4 Claims, 4 Drawing Sheets

COMMUNICATION CONTROL APPARATUS

BACKGROUND OF THE INVENTION

1. Field of the Invention

The present invention relates to a communication control apparatus, particularly to a communication control apparatus used for performing communication among a plurality of electronic devices mounted on a vehicle.

2. Description of the Related Art

Typically, a plurality of electronic devices are mounted on a vehicle and the electronic devices are connected with each other through a wired network. In the wired network, car body information and the like can be transmitted by using a communication control apparatus mounted on the vehicle. The communication control apparatus has a circuit dedicated for disconnecting an electronic device from the wired network when something wrong occurs in the electronic device. This circuit prevents a bad effect on other electronic devices when one electronic device is broken down in the vehicle, so that communication can be continued by normal electronic devices.

FIG. 4 shows an example of the above-described circuit. FIG. 4 shows a circuit configuration of a known communication control apparatus. This circuit mainly includes a control unit 31 configured of a micro computer or the like, a trouble detecting unit 32 for detecting a trouble in the control unit 31, and a communication control unit 33 that interrupts communication when a trouble is detected, that is, controls communication by disconnecting an electronic device. The trouble detecting unit 32 includes a watchdog circuit 321 for observing signals from the control circuit 31 and a mono multi unit 322 for generating square waves in response to signals from the watchdog circuit 321.

In the communication control apparatus shown in FIG. 4, a pulse signal (clock pulses: signal "a" in FIG. 4) of predetermined intervals is output from the control unit 31 to the watchdog circuit 321 when the control unit 31 normally operates. If the control unit 31 breaks down (or has a trouble) and no pulse signal is output (right side of a broken line of signal "a" in FIG. 4), the watchdog circuit 321 cannot detect a pulse signal and outputs reset pulses (signal "b" in FIG. 4) to the mono multi unit 322. After receiving the reset pulses, the mono multi unit 322 generates a square wave (signal "c" in FIG. 4) whose output time is longer than that of the reset pulse. The communication control unit 33 receives the square wave and then controls communication by disconnecting the electronic device (signal "d" in FIG. 4). In this way, when a failure or trouble occurs in a specific electronic device, the electronic device can be disconnected from the wired network. (Patent Document 1: Japanese Unexamined Patent Application Publication No. 7-240969)

In the configuration shown in FIG. 4, however, if noise occurs between the watchdog circuit 321 and the mono multi unit 322, the mono multi unit 322 outputs the noise while amplifying it onto a square wave having a long output time even when the noise has low energy. Therefore, even when the control unit 31 has neither a failure nor trouble, the communication control unit 33 controls communication by disconnecting an electronic device in response to the square wave.

SUMMARY OF THE INVENTION

The present invention has been made in view of the above-described problems, and an object of the present invention is to provide a communication control apparatus capable of minimizing an effect of noise generated in the communication control apparatus and disconnecting only an electronic device in which a failure or trouble has occurred from a wired network.

According to an aspect of the present invention, there is provided a communication control apparatus communicating with other electronic devices. The communication control apparatus includes a control unit for outputting a communication signal and periodically outputting clock pulses during a normal operation; an analog amount converting unit for converting the clock pulses to an analog amount; an analog amount comparing unit for outputting a control signal when the analog amount exceeds a predetermined threshold; and a communication control unit for interrupting communication based on the control signal.

With this configuration, the analog amount that is accumulated when no clock pulse is input is compared with the threshold and a communication interrupting operation starts when the analog amount exceeds the threshold. Therefore, even when a slight amount of noise is generated in the communication control apparatus (particularly in the analog amount converting unit), the accumulated analog amount changes only slightly and a communication interrupting operation is not performed wrongly. In this way, an effect of the noise generated in the communication control apparatus can be minimized and only an electronic device in which a failure or trouble has occurred can be disconnected from the wired network.

The analog amount converting unit may include a switching device that is turned ON upon input of the clock pulse and a charge accumulating unit for being discharged when the switching device is in an ON state and being charged when the switching device is in an OFF state.

With this configuration, charge can be accumulated when no clock pulse is input and the charge can be emitted when a clock pulse is input. Accordingly, a configuration of accumulating an analog amount when no clock pulse is input can be realized.

The charge accumulating unit may include a capacitor for accumulating charge, a first resistor provided on a discharging path, and a second resistor provided on a charging path.

The threshold may be set in accordance with time constants of the capacitor and the first and second resistors.

With this configuration, by adequately setting the time constants of the capacitor and the first and second resistors, a time period from detection of a trouble to interruption of communication can be arbitrarily adjusted in the communication control apparatus.

According to the present invention, in the communication control apparatus communicating with other electronic devices, clock pulses periodically output from the control unit are converted to an analog amount, and communication is interrupted when the analog amount exceeds a predetermined threshold. Therefore, an effect of noise generated in the communication control apparatus can be minimized and only an electronic device in which a failure or trouble has occurred can be disconnected from a wired network.

DESCRIPTION OF THE PREFERRED EMBODIMENTS

The inventors of the present invention focused attention on a problem that noise generated in a communication control apparatus is wrongly detected as a reset pulse, which is a control signal to interrupt communication, and that communication is interrupted even if no trouble occurs in an electronic device. The inventors have found that an effect of noise generated in the communication control apparatus can be minimized and only an electronic device in which a failure or trouble has occurred can be disconnected from communication by determining an analog amount that is accumulated when no clock pulse is input from a control unit as a parameter, and finally made this invention.

That is, the essentials of the present invention are as follows. In a communication control apparatus communicating with other electronic devices, clock pulses periodically output from a control unit are converted to an analog amount, and when the analog amount exceeds a predetermined threshold, communication is interrupted. Accordingly, an effect of noise generated in the communication control apparatus is minimized and only an electronic device in which a failure or trouble has occurred is disconnected from a wired network.

Hereinafter, embodiments of the present invention are described in detail with reference to the attached drawings.

First Embodiment

Figure 1:
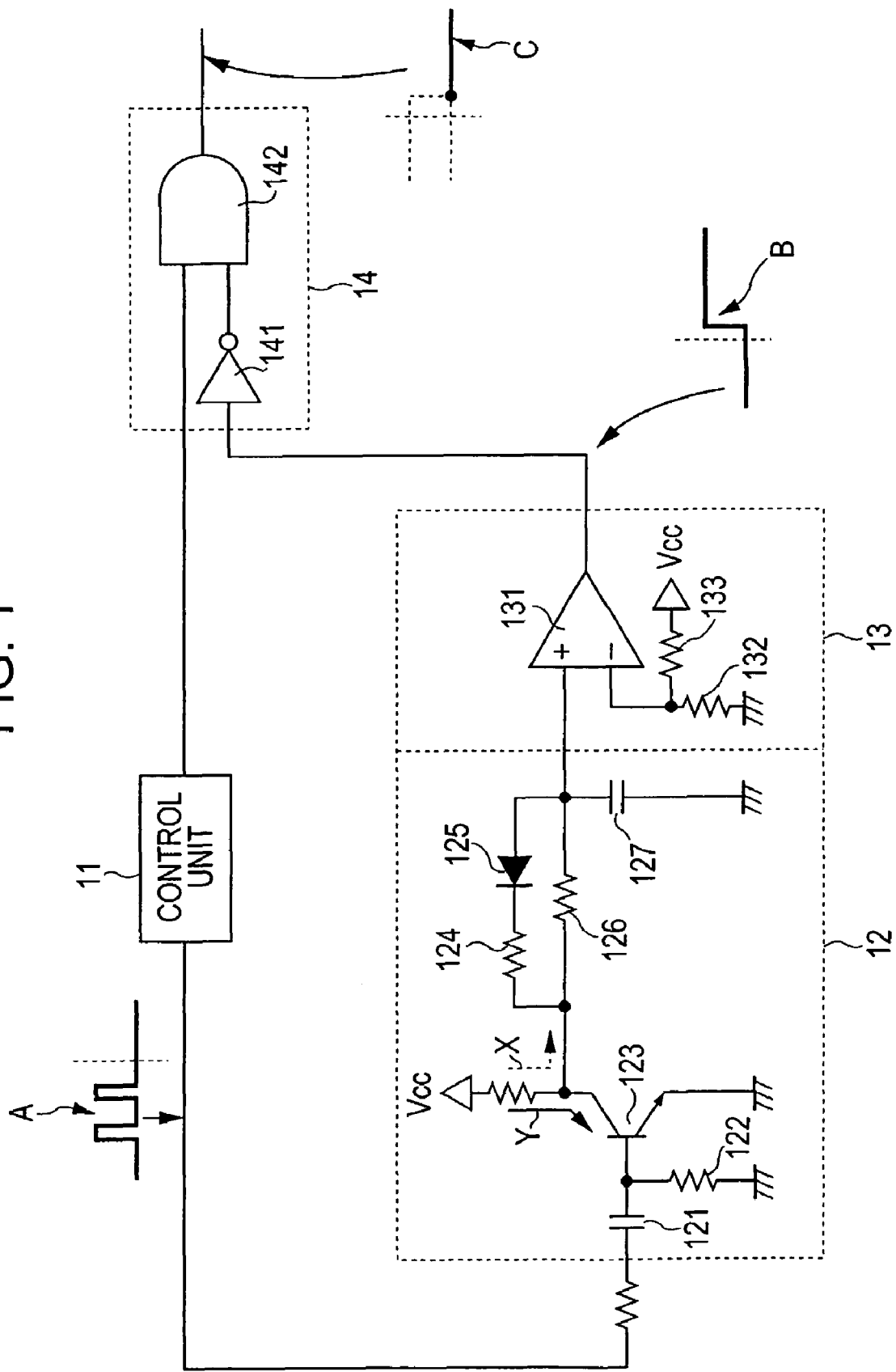
FIG. 1 shows a circuit configuration of a communication control apparatus according to a first embodiment of the present invention.

FIG. 1 shows a circuit configuration of a communication control apparatus according to a first embodiment of the present invention. The communication control apparatus shown in FIG. 1 controls communication among a plurality of electronic devices mounted on a vehicle through a wired network and mainly includes a control unit 11 configured of a micro computer or the like and periodically outputting clock pulses, a trouble detecting unit to detect a trouble in the control unit 11, and a communication control unit 14 to interrupt communication when a trouble is detected, that is, to control communication by disconnecting an electronic device. The trouble detecting unit is composed of an analog amount converting unit 12 to convert clock pulses from the control unit 11 to an analog amount and an analog amount comparing unit 13 to compare the analog amount generated in the analog amount converting unit 12 with a predetermined threshold.

The analog amount converting unit 12 converts clock pulses output from the control unit 11 to an analog amount. Herein, the analog amount converting unit 12 converts the clock pulses to an analog amount by performing charge or discharge according to input of the clock pulses. More specifically, the analog amount converting unit 12 includes a capacitor 121 to receive clock pulses, a resistor 122 to restrict a base current of a bipolar transistor (described later), a bipolar transistor 123 serving as a switching device that is turned ON upon input of a clock pulse and is turned OFF when no clock pulse is input, a discharging path including a first resistor 124 and a diode 125, a charging path including a second resistor 126, and a charge accumulating capacitor 127. With this configuration, charge can be accumulated when no clock pulse is input and the charge can be emitted when a clock pulse is input. Accordingly, a configuration in which an analog amount is accumulated when no clock pulse is input can be realized.

In this analog amount converting unit 12, the transistor 123 is in an OFF-state when no clock pulse is detected in the capacitor 121. At this time, a charge current from a Vcc passes through the charging path and is accumulated in the charge accumulating capacitor 127, so that a voltage rises. On the other hand, when a clock pulse is detected in the capacitor 121, the transistor 123 is turned ON, and then the charge accumulated in the charge accumulating capacitor 127 is discharged through the discharging path.

The analog amount comparing unit 13 compares an analog amount generated in the analog amount converting unit 12 with a predetermined threshold, and outputs a control signal to the communication control unit 14 when the analog amount exceeds the predetermined threshold. More specifically, the analog amount comparing unit 13 includes resistors 132 and 133 to divide the Vcc and a comparator 131 to compare a reference voltage (threshold) with a voltage of the charge accumulating capacitor 127.

The threshold can be adequately set in accordance with time constants of the charge accumulating capacitor 127, the first resistor 124, and the second resistor 126. By setting the resistance of the second resistor 126 at a larger value than the resistance of the first resistor 124, the side of the first resistor 124 and the diode 125 can function as the discharging path and the side of the second resistor 126 can function as the charging path. Further, the resistances of the resistors 132 and 133 are set in accordance with the threshold determined based on the time constants (RC type) of the first and second resistors 124 and 126 and the charge accumulating capacitor 127 of the analog amount converting unit 12. For example, when the threshold is high so that a time period from detection of a trouble to interruption of communication is long, the resistance of the resistor 133 is set to a larger value. On the other hand, when the threshold is low so that a time period from detection of a trouble to interruption of communication is short, the resistance of the resistor 132 is set to a larger value. Accordingly, the time period from detection of a trouble to interruption of communication can be arbitrarily adjusted in the communication control apparatus.

The communication control unit 14 interrupts communication when the trouble detecting unit detects a trouble. The communication control unit 14 includes a NOT gate 141 on an output side of the analog amount comparing unit 13 and an AND gate 142 on output sides of the NOT gate 141 and the control unit 11. Each of the NOT gate 141 and the AND gate 142 is configured of a transistor.

The communication control unit 14 receives a control signal, which is generated when the trouble detecting unit composed of the analog amount converting unit 12 and the analog amount comparing unit 13 detects a trouble or when the analog amount exceeds the predetermined threshold, and interrupts communication in response to the control signal. Accordingly, an electronic device in which a trouble has been detected is disconnected from the wired network.

Next, an operation of the communication control apparatus having the above-described configuration is described. Herein, the resistance of the second resistor 126 in the charging path is set to a considerably larger value than the resistance of the first resistor 124 in the discharging path of the analog amount converting unit 12.

When the control unit 11 normally operates, a pulse signal (clock pulses: signal "A" in FIG. 1) of predetermined intervals is output from the control unit 11 to the analog amount converting unit 12 in the trouble detecting unit. When the clock pulse is input to the capacitor 121 of the analog amount converting unit 12, a base current restricted by the resistor 122 flows into a base of the bipolar transistor (hereinafter abbreviated as a transistor) 123. Accordingly, the transistor 123 is turned ON. After the transistor 123 is turned ON, a collector current flows into a collector of the transistor 123 as indicated by a solid-line arrow Y, and an emitter current flows out from an emitter of the transistor 123. At this time, a charge accumulated in the charge accumulating capacitor 127 flows out from the emitter through the discharging path (diode 125 and first resistor 124). Accordingly, discharge from the charge accumulating capacitor 127 is performed, so that the voltage of the charge accumulating capacitor 127 (Z point) drops.

On the other hand, when the control unit 11 does not operate normally, that is, when a failure or trouble occurs therein, the clock pulses (signal "A" in FIG. 1) of predetermined intervals do not output from the control unit 11. Therefore, no clock pulse is input to the capacitor 121 of the analog amount converting unit 12, and thus the transistor 123 is turned OFF. When the transistor 123 is in an OFF state, a charge current flows through the charging path (second resistor 126) to the charge accumulating capacitor 127 as indicated by a dotted-line arrow X, so that the voltage rises.

As described above, in the analog amount converting unit 12, the charge accumulated in the charge accumulating capacitor 127 is discharged to decrease the voltage as an analog amount when receiving a clock pulse from the control unit 11. When no clock pulse is input thereto from the control unit 11, charge is accumulated in the charge accumulating capacitor 127 to increase the voltage as an analog amount. In this way, the analog amount converting unit 12 indicates whether a clock pulse has been input or not in a form of an analog amount.

The voltage at the Z point of the analog amount converting unit 12 is compared with the threshold in the comparator 131 of the analog amount comparing unit 13. As described above, this threshold is set in accordance with the time constants of the first resistor 124, the diode 125, and the second resistor 126 in the analog amount converting unit 12, and is realized by the resistors 132 and 133 in the analog amount comparing unit 13. When the voltage at the Z point exceeds the threshold in the comparator 131, the comparator 131 outputs a control signal to the communication control unit 14, that is, outputs a square wave like a signal "B" in FIG. 1 (High signal: H signal). On the other hand, when the voltage at the Z point does not exceed the threshold, the comparator 131 outputs a square wave (Low signal: L signal) to the communication control unit 14.

The communication control unit 14 inverts the square wave from the comparator 131 by the NOT gate 141. Therefore, in the NOT gate 141, an H signal input from the comparator 131 is inverted to an L signal and an L signal input from the comparator 131 is inverted to an H signal.

In either case where a communication signal input from the control unit 11 to the AND gate 142 is in a low state or a high state, the output signal from the AND gate 142 is always in a low state (signal "C" shown in FIG. 1) if an L signal has been input from the NOT gate 141, so that communication is interrupted. An H signal is output from the comparator 131 to the communication control unit 14 when the voltage at the Z point exceeds the threshold. The H signal is inverted to an L signal by the NOT gate 141 in the communication control unit 14. Due to the L signal, the signal output from the AND gate 142 is always an L signal in either case where the communication signal from the control unit 11 is an L signal or an H signal. In this way, the communication is interrupted and the electronic device is disconnected from the wired network. "To interrupt communication" herein means that a communication signal output from the control unit is prevented from being externally transmitted.

On the other hand, when the voltage at the Z point does not exceed the threshold, the comparator 131 outputs an L signal to the communication control unit 14. Then, the L signal is inverted to an H signal in the NOT gate 141 in the communication control unit 14. Due to the H signal, the signal output from the AND gate 142 is an L signal when the signal from the control unit 11 is an L signal and is an H signal when the signal from the control unit 11 is an H signal. That is, the electronic device is not disconnected from the wired network.

Figure 2:
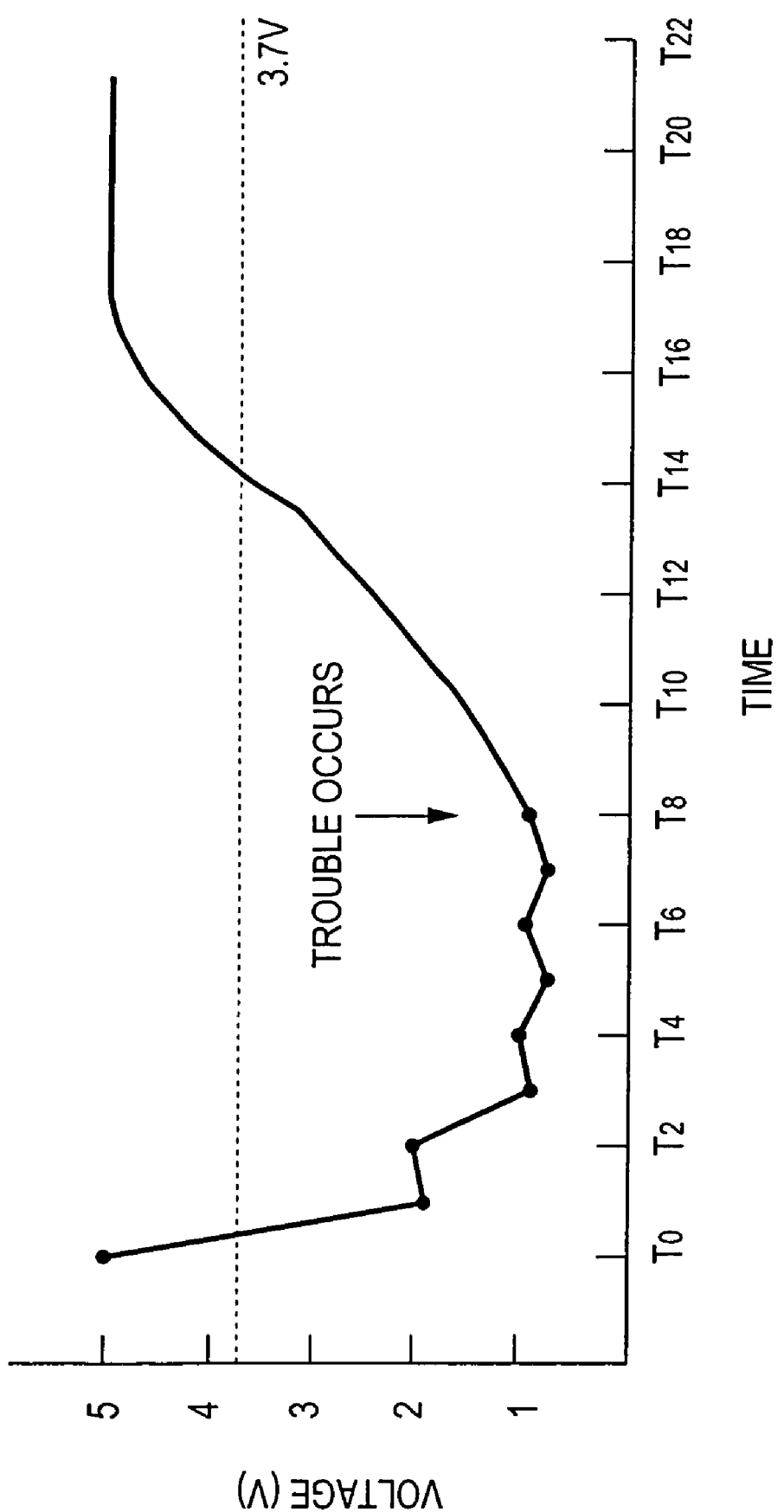
FIG. 2 illustrates an operation of the communication control apparatus shown in FIG. 1.

Next, how an electronic device in which a trouble has occurred is actually disconnected from the wired network is described with reference to FIG. 2. First, when the clock pulses are input from the control unit 11 (timings $T_0$, $T_2$, $T_4$, ..., $T_{22}$, ...), the transistor 123 is turned ON, and a charge accumulated in the charge accumulating capacitor 127 is discharged through the discharging path. As shown in FIG. 2, the voltage drops in accordance with input of the clock pulses at timings $T_0$, $T_2$, and $T_4$.

If a trouble occurs in an electronic device at timing $T_8$ and no clock pulse is input from the control unit 11, a charge is accumulated in the charge accumulating capacitor 127 and the voltage rises. Then, when the voltage exceeds the threshold voltage of 3.7 V, the communication control unit 14 interrupts communication and the electronic device is disconnected from the wired network.

As described above, the communication control apparatus having the above-described configuration is capable of disconnecting a specific electronic device from the wired network when a failure or trouble occurs in the electronic device. In this configuration, unlike in the known technique in which a communication interrupting operation starts upon detection of a reset pulse, an analog amount accumulated in a state where no clock pulse is input from the control unit is used as a parameter and a communication interrupting operation starts when the analog amount exceeds a threshold. Therefore, even when a slight amount of noise occurs in the communication control apparatus (particularly in the analog amount converting unit), the accumulated analog amount changes only slightly and a communication interrupting operation is not performed wrongly. Accordingly, an effect of noise generated in the communication control apparatus can be minimized and only an electronic device in which a failure or trouble has occurred can be disconnected from the wired network.

Second Embodiment

Figure 3:
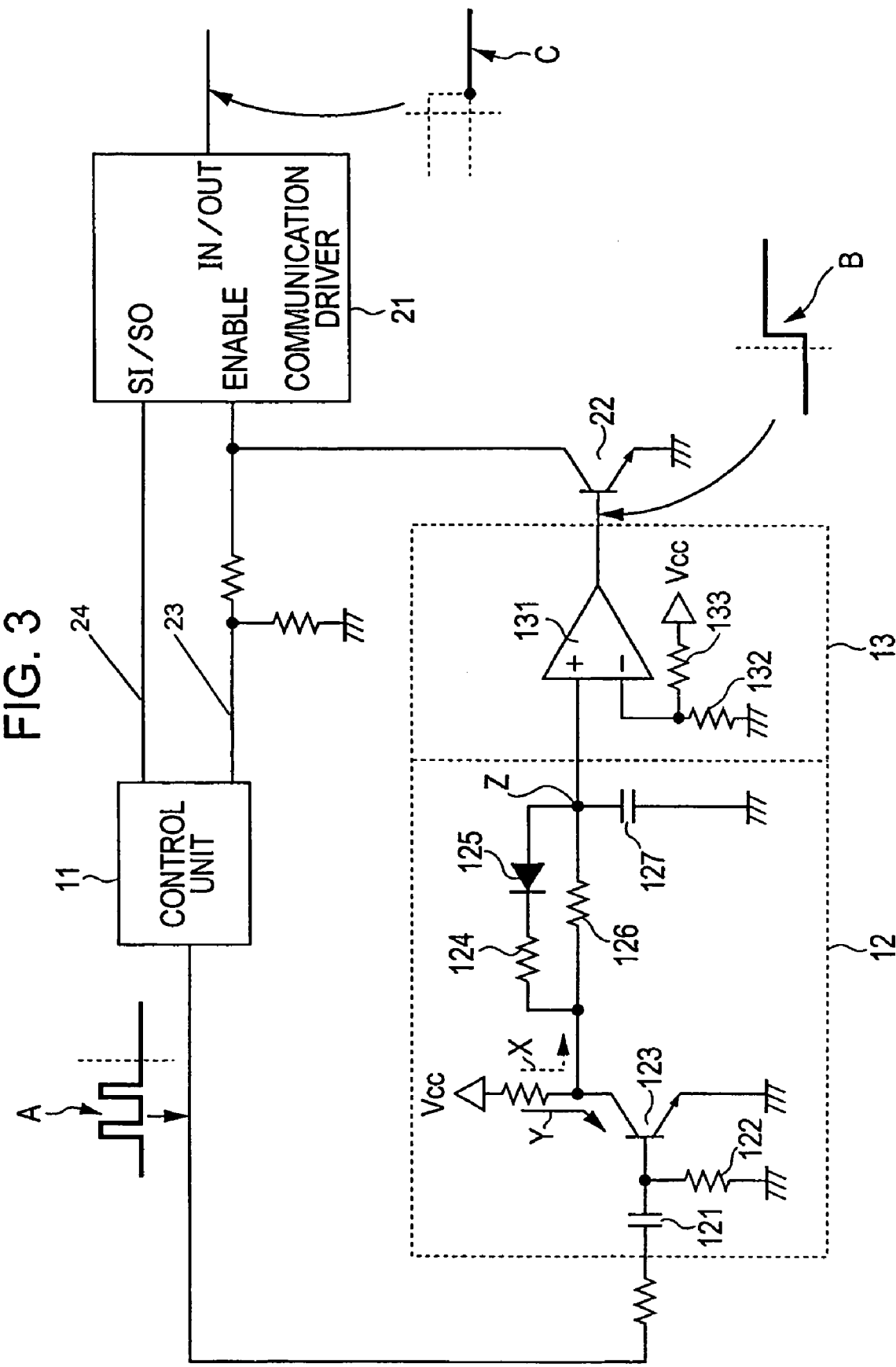
FIG. 3 shows a circuit configuration of a communication control apparatus according to a second embodiment of the present invention.
Figure 4:
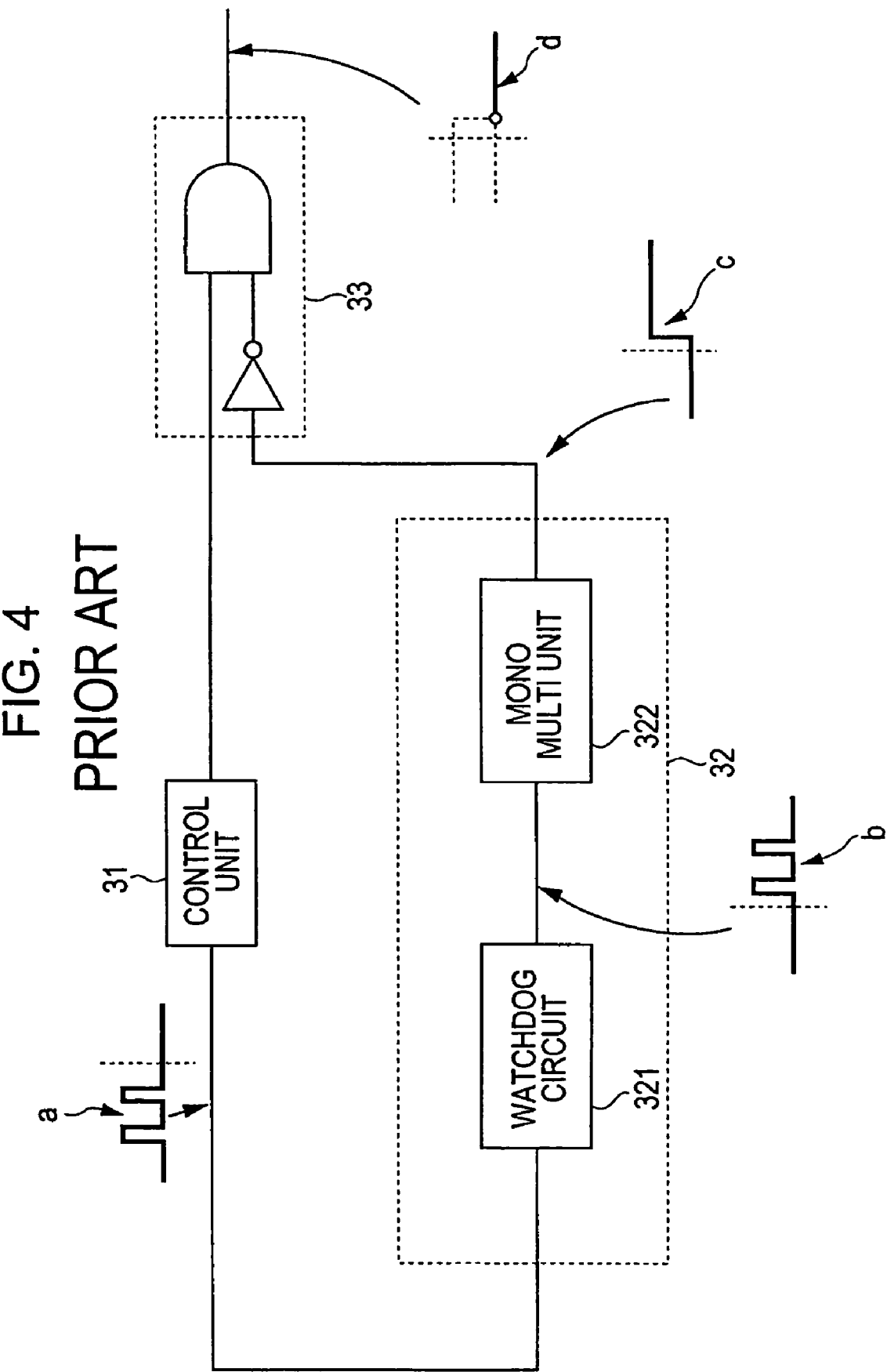
FIG. 4 shows a circuit configuration of a known communication control apparatus.

FIG. 3 shows a circuit configuration of a communication control apparatus according to a second embodiment of the present invention. In FIG. 3, parts that are the same as those in FIG. 1 are denoted by the same reference numerals and the detailed description thereof is omitted. In FIG. 3, a communication driver 21 is used instead of the communication control unit 14. In order to use the communication driver 21, a bipolar transistor 22 is provided between the comparator 131 of the analog amount comparing unit 13 and the communication driver 21.

In the communication control apparatus having such a configuration, a drive control signal to control switching between enable and disable of the communication driver 21 is output from the control unit 11 to the communication driver 21 through a communication driver driving line 23. In other words, the control unit 11 controls enable/disable of the communication driver 21 by using the drive control signal. Additionally, various signals are transmitted from the control unit 11 to the communication driver 21 through a communication driver line 24.

In the above-described communication control apparatus, conversion to an analog amount and comparison of the analog amount are performed as in the first embodiment. When a voltage at the Z point exceeds a threshold in the comparator 131, the comparator 131 outputs a control signal to the bipolar transistor 22, that is, outputs a square wave (High signal: H signal) like a signal "B" shown in FIG. 3. On the other hand, when the voltage at the Z point does not exceed the threshold, the comparator 131 outputs a square wave (Low signal: L signal) to the bipolar transistor 22.

After the H signal is output from the comparator 131, the drive control signal from the control unit 11 is transmitted to an emitter side of the bipolar transistor 22. Therefore, the communication driver 21 does not detect this drive control signal and is brought into a disable state, so that the communication is interrupted (a signal "C" shown in FIG. 3) and this electronic device is disconnected from the wired network. On the other hand, when an L signal is output from the comparator 131, the drive control signal is not transmitted to the emitter side of the bipolar transistor 22. Thus, the communication driver 21 is brought into an enable state if the drive control signal has been output. In this case, the communication is not interrupted and this electronic device is not disconnected from the wired network. "To interrupt communication" herein means that a communication signal output from the control unit is prevented from being externally transmitted.

As described above, in the communication control apparatus having the above-described configuration, a specific electronic device can be disconnected from a wired network when a failure or trouble occurs in the electronic device. In other words, an analog amount accumulated in a state where no clock pulse is input from the control unit is used as a parameter and a communication interrupting operation starts when the analog amount exceeds a threshold. Therefore, even when a slight amount of noise is generated in the communication control apparatus (particularly in the analog amount converting unit), the accumulated analog amount changes only slightly and a communication interrupting operation is not performed wrongly. Accordingly, an effect of noise generated in the communication control apparatus can be minimized and only an electronic device in which a failure or trouble has occurred can be disconnected from the wired network.

The present invention is not limited to the above-described first and second embodiments, and various modifications can also be adopted. For example, the configurations of the analog amount converting unit, the analog amount comparing unit, and the communication control unit are not limited to those in the first and second embodiments, and can be adequately modified without deviating from the scope of the present invention.

What is claimed is:

1. A communication control apparatus communicating with other electronic devices, comprising:
   a control unit for outputting a communication signal and periodically outputting clock pulses during a normal operation;
   an analog amount converting unit for converting the clock pulses to an analog amount;
   an analog amount comparing unit for outputting a control signal when the analog amount exceeds a predetermined threshold; and
   a communication control unit for interrupting communication based on the control signal.

2. The communication control apparatus according to claim 1, wherein the analog amount converting unit includes a switching device that is turned ON upon input of the clock pulse and a charge accumulating unit for being discharged when the switching device is in an ON state and being charged when the switching device is in an OFF state.

3. The communication control apparatus according to claim 2, wherein the charge accumulating unit includes a capacitor for accumulating charge, a first resistor provided on a discharging path, and a second resistor provided on a charging path.

4. The communication control apparatus according to claim 3, wherein the threshold is set in accordance with time constants of the capacitor and the first and second resistors.

* * * * *